Nov. 29, 1955  H. W. McPHERSON  2,724,837
SELF-CONTAINED SEWERAGE SYSTEM
Filed Nov. 14, 1951  3 Sheets-Sheet 1

INVENTOR.
Hal Weir McPherson
BY
Mann, Brown & Hansmann
Attys.

Nov. 29, 1955  H. W. McPHERSON  2,724,837
SELF-CONTAINED SEWERAGE SYSTEM
Filed Nov. 14, 1951  3 Sheets-Sheet 2
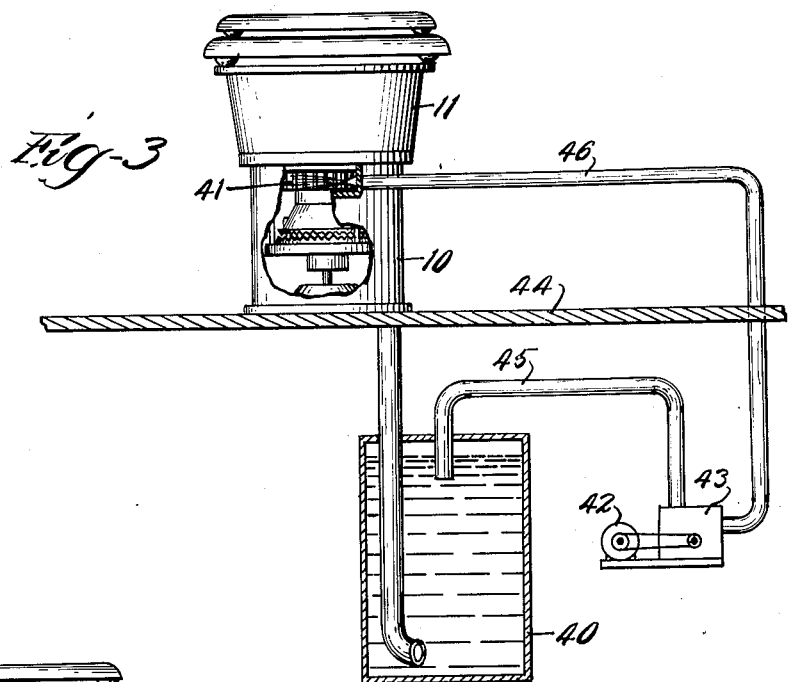
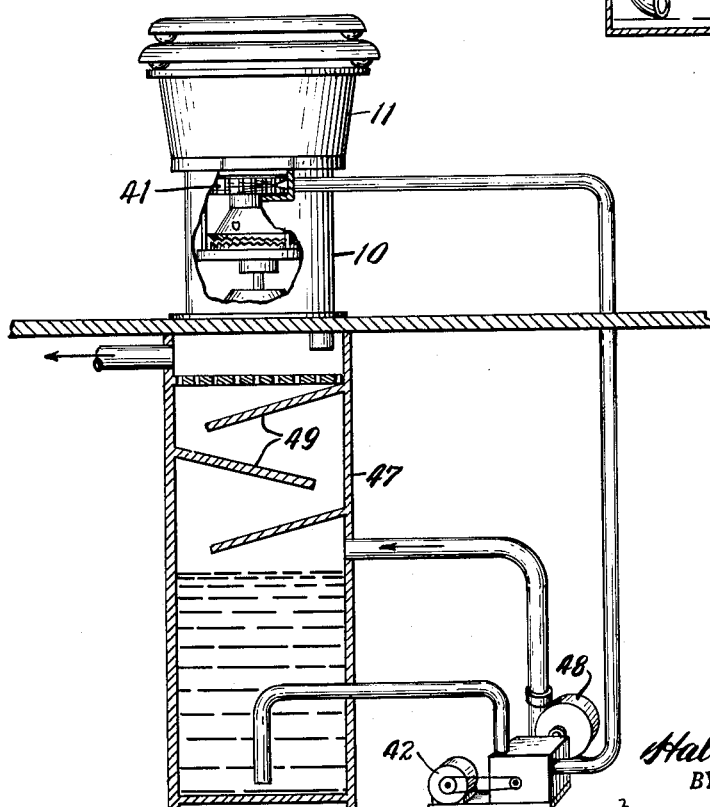
INVENTOR.
Hal Weir McPherson
BY
Mann, Brown & Hansmann
Attys.

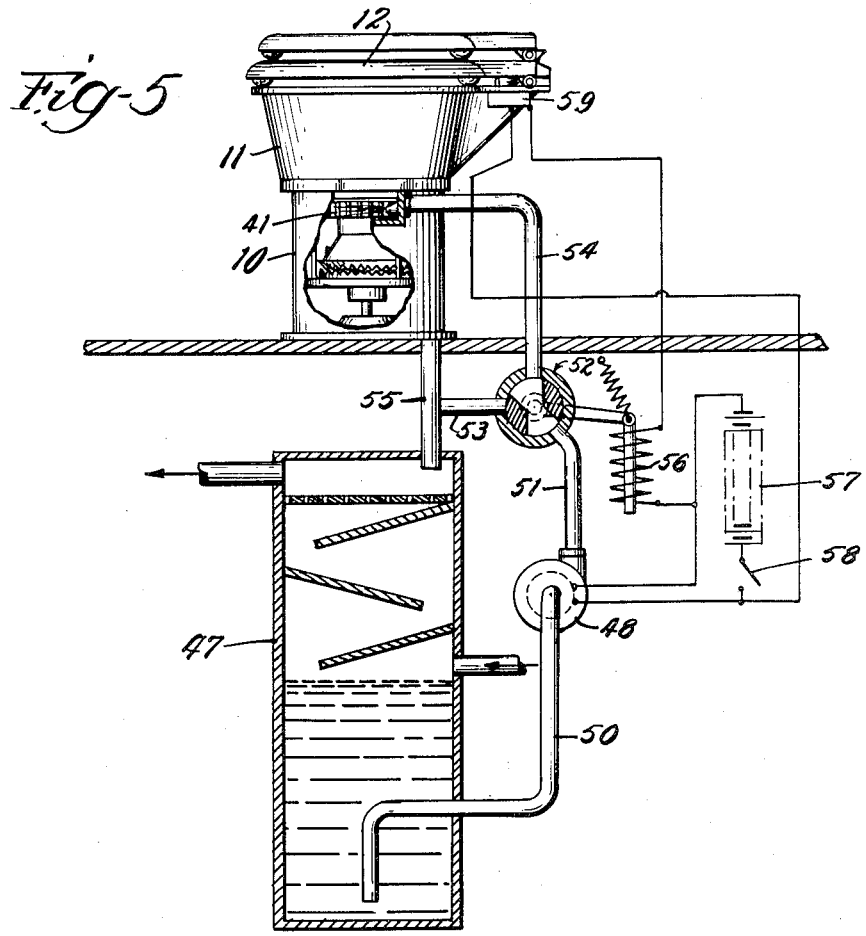

United States Patent Office 2,724,837
Patented Nov. 29, 1955

2,724,837

SELF-CONTAINED SEWERAGE SYSTEM

Hal Weir McPherson, Chicago, Ill.

Application November 14, 1951, Serial No. 256,259

1 Claim. (Cl. 4—10)

This invention relates to a self-contained sewerage system applicable particularly to vehicles such as aircraft, railway trains, house trailers, and the like where toilet facilities are normally provided. However, the invention is not limited to use with vehicles.

The handling of sewage for airplanes, railways trains, house trailers, etc., has always been a troublesome problem, not only because of the difficulties in disposing of the sewage in a sanitary manner, but also because of the limited water supply carried by such vehicles. The present invention seeks to overcome this problem by providing a self-contained sewerage system that can be readily housed within the limited space available on such vehicles and yet is adequate for the handling of the sewage for a limited period of time.

Many of the features of this invention are also applicable for the handling of sewage for stationary installations, particularly where frozen ground conditions or rocky terrain make impractical the use of septic tanks. In such localities, sewage disposal has been a most difficult problem with which to cope.

Other objects of the invention include the provision of a complete sewage disposal system, including a toilet, a water supply, and sewage treatment—all contained within a unit that is light in weight, occupies a minimum amount of space, and requires minimum care for maintenance.

These and other objects and advantages will become apparent after the disclosure proceeds and the description is read in conjunction with the accompanying drawings in which:

Figure 3 shows a modification of the invention in which a separate tank is provided for holding the flushing water supply and receiving the comminuted sewage;

Figure 4 shows another modification of the invention in which aeration is provided in conjunction with the tank beneath the toilet hopper; and Figure 5 shows still another modification of the invention in which the circulation of fluid through the aeration system is segregated from the toilet fixture with automatic means being provided for including the toilet fixture in the fluid circulation circuit when the toilet is in use.

It should be understood that the invention may be variously embodied within the scope of the appended claims, and the disclosure of certain preferred forms of the invention is for the purpose of complying with section 4888 of the revised statutes.

Figure 1:
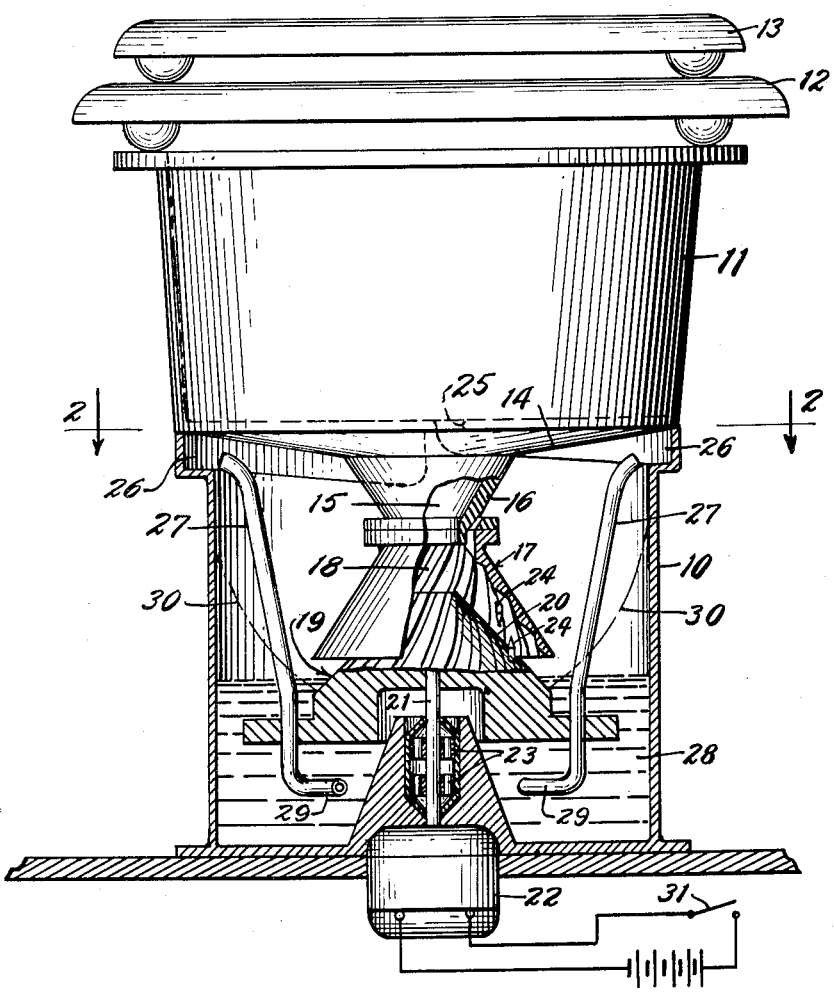
Figure 1 is a front elevational view, partly in section, which shows an electrically driven unit built in accordance with the teachings of this invention.
Figure 2:
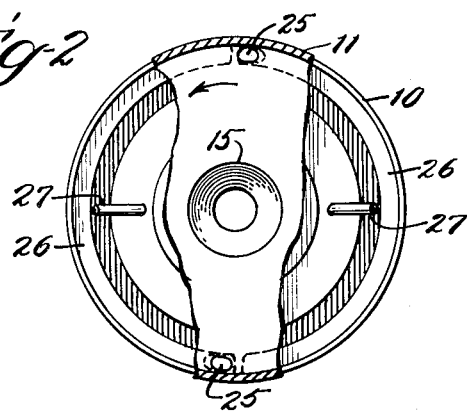
Figure 2 is a horizontal sectional view on the line 2—2 of Figure 1.

The invention is illustrated somewhat diagrammatically in the drawings, but by referring to Figure 1, it will be seen that for this particular embodiment of the invention, the sewage disposal system comprises a base or receptacle 10 upon which a hopper 11 rests and is suitably secured thereto. Preferably the base 10 and hopper 11 are made of aluminum or other lightweight material, and the hopper 11 is provided with the usual toilet seat 12 and closure 13.

The bottom of the hopper 11 is dished inwardly as indicated at 14. It has a central opening 15 defined by a conical wall 16 to which is attached an outwardly flared grinding element 17 having inclined teeth 18. The grinding element 17 is positioned in suitable grinding relationship with a rotary grinding element generally indicated at 19, which is provided with a plurality of oppositely inclined teeth 20 which are in close proximity to the teeth 18 of the stationary element 17. The rotary grinding element 19 is supported on a shaft 21 driven by a motor 22 mounted beneath the unit, and the shaft is suitably supported by aligned bearings 23.

The stationary and rotary grinding elements 17 and 19 have a plurality of vertically extending intercalated teeth 24 which, together with the grinding teeth 18 and 20 of the two elements, effectively comminute all sewage passing through the opening 16 with the teeth 24, being particularly effective in shredding paper which may be thrown into the bowl or hopper 11.

It will also be noticed that the cooperating grinding elements 17 and 19 have cone angles which cause the grinding elements to converge toward their peripheries, whereby the material being comminuted is forced through increasingly smaller areas while passing through the grinding unit to more effectively comminute the sewage.

For a more complete disclosure of the comminuting device, reference is made to my copending application, Serial No. 234,363, filed June 29, 1951, the disclosure of which is incorporated herein by reference.

The hopper 11 is provided with diametrically opposed openings 25 located adjacent the side wall of the hopper, each such opening being in communication with an inclined annular channel 26 provided in the side wall of the receptacle 10. The rotary grinding element 19 has mounted on it a plurality of centrifugal nozzles 27 which have their lower ends immersed in the fluid 28 in the receptacle 10, and as the rotary element 19 is spun at motor speed by the motor 22, the fluid from the receptacle or sump 10 will be picked up by the nozzles 27 and thrown by centrifugal force into the annular channels 26 from whence the fluid will be forced by the peripheral rotation within the channel 26 through the openings 25 and into the hopper 11 for flushing action.

If desired, the lower ends 29 of the nozzles 27 may be bent in the direction in which they rotate so that fluid from the sump 10 will be forced upwardly through the nozzle by movement of the ends 29 through the fluid sump. Also, if desired, the upper ends of the nozzles 27 may be turned slightly in the direction of their rotation to aid in the peripheral rotation of the fluid in the annular channels 26 in a direction that will cause the fluid to be discharged through the openings 25 on opposite sides of the hopper 11.

In operation, the receptacle or sump 10 is initially filled with water to a suitable level, which may be above the lower margin of the stationary grinding element 17 inasmuch as rotation of the inner grinding element 19 will cause the fluid in the base 10 to flow by centrifugal force to a position such as shown in dotted lines at 30 in Figure 1. A switch 31 in the motor circuit is then closed and the grinding element continuously rotated during the entire time that the system is in operation. Rotation of the grinding element 19 causes fluid to be continuously forced upwardly through the nozzles 27 and more or less sprayed into the annular channels 26, where the fluid becomes thoroughly aerated before it is introduced into the hopper 11 through the openings 25. The fluid thus introduced into the hopper then flows downwardly through the opening 16 and the grinding unit back to the sump 10 for recirculation.

Considering the fact that in normal usage the fluid 28 in the sump 10 is being continuously circulated and aerated for a large portion of the time as compared with the time that the toilet is actually in use, the system is capable of providing adequate aeration of the fluid 28 with its admixed sewage. The grinding elements 17 and 19 finely comminute all sewage passing into the sump 10, and with continuous aeration, the bacterial count may be kept within accepted limits for limited periods of time. It is contemplated, of course, that when such a system is used on vehicles, the sump 10 will be periodically drained and refilled with fresh water, and normally this can be done when the vehicle is brought in for ordinary servicing at the end of any particular run or trip.

In the form of the invention shown in Figure 3, an auxiliary sump 40 is provided, and the grinding element generally designated 41 is hydraulically driven rather than electrically driven. Such a hydraulically driven motor and comminuting device is fully disclosed in my copending application, Serial No. 231,414, filed June 13, 1951, now matured into United States Patent No. 2,604,633, and the disclosure of that application is hereby incorporated by reference.

As will be seen by referring to said copending application, Serial No. 231,414, now matured into United States Patent No. 2,604,633, the grinding element is driven by a pelton wheel against the periphery of which a high velocity jet of water is directed, and obviously, such ejection of a water stream against a bladed wheel necessarily breaks up the stream of water into fine particles and causes substantial aeration thereof. Hence the embodiment of the invention shown in Figure 3 has a continuously driven motor 42 which is used to drive a fluid pump 43 to continuously take fluid from the sump tank 40 and force it at high velocity against the pelton wheel of the grinding unit 41.

As disclosed in said copending application, Serial No. 231,414, now matured into United States Patent No. 2,604,633, the water, after striking the pelton wheel of the grinding unit, travels through an annular channel into the toilet hopper 11 for flushing action in the same manner as described with reference to Figure 1, whereupon the fluid passes through the grinding unit into the base or receptacle 10 of the toilet fixture.

In other words, in the form of the invention shown in Figure 3, the sump 40 becomes somewhat of a settling tank and may be mounted beneath the floor 44 of the room or compartment housing the toilet fixture. The fluid is drawn off from the top of this tank by a pipe 45 and is then forced through a conduit 46 against the driving wheel or pelton wheel of the grinding unit 41 where aeration takes place. Again, it is the continuous circulation and aeration of the fluid in the tank 40 which enables the system to take care of the sewage load for the limited periods of time between replenishment of the tank 40. Tests have indicated that such period of time may extend twenty-four or forty-eight hours, or possibly longer, depending upon the frequency with which the toilet is used.

In Figure 4, additional aeration of the sewage is provided by an aeration tower 47 which also serves as a fluid sump, and in this instance, a blower 48 provides a continuous upward circulation of air through the tower 47 as the fluid from the toilet fixture trickles over the inclined shelves 49. This aeration action is in addition to the aeration which takes place at the pelton wheel of the grinding device.

In the form of the invention shown in Figure 5, means are provided for confining the aeration action to a circuit which does not include the toilet fixture itself so that only when the toilet is in use is the flushing fluid circulated through the toilet fixture.

More specifically, the fixture comprises the base 10 and hopper 11 with the hydraulically driven comminuting unit 41 which is described in detail in said application, Serial No. 231,414, now matured into United States Patent No. 2,604,633, and the aeration system includes an aeration tank 47 similar in all respects to the aeration tank disclosed in Figure 4. The fluid pump 48, which circulates fluid from the aeration tank 47, has an inlet 50 connected to the bottom of the tank 47 and an outlet 51 which leads to a two-way valve 52 for directing the fluid under pressure either to a conduit 53 for immediate return to the aeration tank 47 or to a conduit 54 for driving the pelton wheel of the grinding unit 41 and for subsequent flushing of the hopper 11. Obviously, the fluid passing through the conduit 54, after performing its flushing action, passes through the grinding unit 41 and returns to the tank 47 through a drain 55.

It is contemplated that the pump 48 should be continuously driven so that aeration of the fluid in the tank 47 takes place continuously while the system is in operation. When the toilet is in actual use, however, it is necessary at that time to divert fluid from the tank 47 through the toilet unit for operation of the grinder and for flushing of the toilet, and this may be done automatically and conveniently by biasing the toilet seat 12 upwardly and by providing suitable electrical contacts for closing an electrical circuit through an actuating coil 56 for the solenoid-operated valve 52 when the toilet seat is dropped to horizontal position for use. The electrical circuit is simple and may comprise a source of electromotive force here indicated as a battery 57, this source being placed in series with the coil 56 through a manual switch 58 and the contacts 59 which are automatically closed when the seat 12 is lowered to horizontal position.

It will therefore be seen that any objection that there might be to continuous circulation of sewage through the hopper 11 may be overcome by permitting such circulating to take place only when the toilet is in use, and by providing continuous aeration of the sewage in the sump 47 at all times through the bypass connection.

Although one might suppose that odors would result from the circulation of sewage containing water, tests have indicated that this is not a real problem because the aeration of the sewage effectively removes the odors.

It is also contemplated that in some practices of the invention other sewage treatment methods may be incorporated such as the use of activated sludge, and this is particularly true when a self-contained unit of this type is to be used for a stationary installation as distinguished from a vehicular installation.

Although in most instances water would be used as the fluid for circulation through the system, other liquids might be used. For example, kerosene or other bacterially inert fluids might be used, particularly if lower freezing points are required. Also, deodorant materials may be added if desired.

I claim:

A self-contained toilet and sewage treatment system for use particularly in vehicles, comprising a toilet bowl having an outlet opening, a sewage comminuting device adjacent the opening, adapted to receive sewage from the opening and grind it, a sewage tank containing liquid and communicating with the comminuting device for receiving comminuted sewage therefrom, and means for substantially continuously subjecting the fluid in the tank to aerobic treatment, said means including two fluid circuits both in series with said tank, a fluid pump, a bypass valve controlling the flow of the fluid through said circuits, one of said circuits including said bowl and the other excluding said bowl, and means for positioning the valve so that the fluid passes through said first circuit when the toilet is not in use and through the second circuit when it is in use.

(References on following page)

References Cited in the file of this patent

UNITED STATES PATENTS

| | | |
|---|---|---|
| 1,303,358 | Montgomery | May 13, 1919 |
| 1,996,325 | Cox | Apr. 2, 1935 |
| 2,131,711 | Porteous | Sept. 27, 1938 |
| 2,180,148 | Imhoff | Nov. 14, 1939 |
| 2,186,371 | Durdin, Jr. | Jan. 9, 1940 |
| 2,249,739 | Brownell et al. | July 22, 1941 |
| 2,414,964 | McPherson | Jan. 28, 1947 |
| 2,559,704 | Bevan | July 10, 1951 |
| 2,562,510 | Schlenz | July 31, 1951 |